Jan. 8, 1935.                  M. E. WILSON                  1,986,991
                                 FISH LURE
                              Filed May 13, 1933
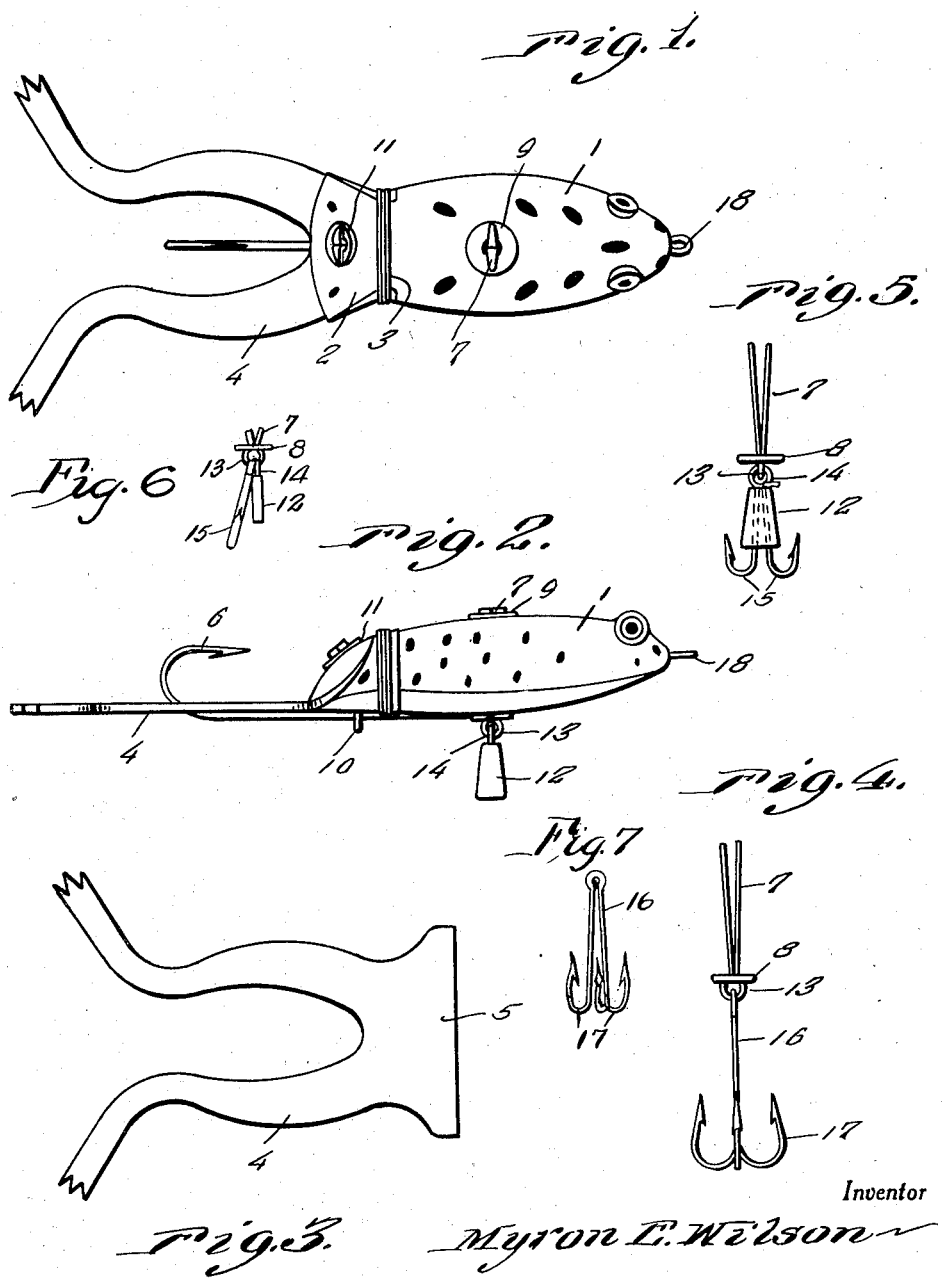
Inventor
Myron E. Wilson
By Clarence A. O'Brien
Attorney Patented Jan. 8, 1935

1,986,991

UNITED STATES PATENT OFFICE 1,986,991

FISH LURE

Myron E. Wilson, Warwick, N. Y.

Application May 13, 1933, Serial No. 670,987

2 Claims. (Cl. 43—42)

This invention relates to a fish lure, the general object of the invention being to provide a lure which will have a natural position when in the water and one which can be used in weeds, grass or lily pads, without being caught in such material.

Another object of the invention is to provide means whereby different kinds of hooks can be easily and quickly attached and the main hook can be used with the hook part extending upwardly or downwardly, as desired.

In the drawing:

Figure 1 is a top plan view of the device.

Figure 2 is an elevation.

Figure 3 is a view of the rubber legs.

Figure 4 is a view of the holder, with a plurality of hooks connected therewith.

Figure 5 is a view of the holder, with the weight and a pair of hooks connected therewith.

Figure 6 is a view looking toward the left of Figure 5.

Figure 7 is a detail view of the hook shown in Figure 4.

In this drawing, the body of the device is shown at 1 and is formed of cork or other buoyant material and the drawing shows the body as made in the form of a frog, but it is, of course, to be understood that it may be made in any other form. The rear of the body slopes downwardly and rearwardly, as shown at 2, and is slightly flared at its side so as to form a reduced part around which may be wrapped the string 3 which holds the legs 4 in position. As shown in Figure 3, these legs are formed of sheet rubber and are connected with the wide base part 5 which is partly wrapped around the rear part 2 of the body and held in position by the string 3. These legs are, of course, flexible and will be moved by the water as the device is drawn through the water and they will also act to prevent weeds, grass or the like from catching in the hook 6, as such material will cause the legs to bend, and this will prevent the hook from being caught in the grass or weeds.

The shank of the hook 6 has its eye receiving the limbs of a holder member 7 which passes through a vertical hole formed in the body, with the ends of its limbs upset, as shown in Figure 1, with the head 8 of the holder member engaging the bottom of the body and a washer 9 placed on the top of the body and the limbs of the holder 7 passed through said washer. A similar holder member 10 passes through the rear part of the body and has an eye at its lower end through which the hook passes, as shown in Figure 2, and the limbs of this member are bent over on the sloping part 2, after being passed through a washer 11.

Thus by pulling the member 7 out of the body and turning the hook 6 and then replacing the holder 7, the hook can be made to assume the position with its hook part upwardly, as shown in Figure 2, or downwardly, as desired.

An equalizing weight 12 is adapted to be connected to an eye 13 fastened to the head 8 of the holder 7. This weight is provided with a coiled or split eye 14 in its upper end for engaging the eye 13 so that the weight is detachably connected with the holder 7. Figures 5 and 6 show a pair of hooks supported from the holder, with the shanks of the hooks in rear of the weight, so that in this arrangement both the weight and the pair of hooks are used with the device. This double hook arrangement is also formed with an open or split eye so that it can be readily connected with the holder or detached therefrom. Figures 4 and 7 show a plurality of hooks 16 supported from the holder and this hook arrangement is also formed with an open eye so that it can be readily attached to or detached from the holder, as desired. These hooks 15 and 17 can be used with or without the weight 12, as desired.

A wire is embedded in the body and passes longitudinally therethrough, with its front end bent to form the eye 18 for receiving the fishing line or leader.

The device, when in the water, will assume a position with its rear end slightly lower than its front end so as to give the natural appearance of a frog floating and the water will move the legs so as to increase the appearance of a frog and these legs, as before described, will prevent the hook 6 from catching in weeds or the like, as they will be moved by the weeds and this movement will tend to prevent the hooks from being caught. Different sizes of weights 12 can be used with the device and different sizes and kinds of hooks.

What I claim is:—

1. A fish lure comprising a buoyant body having its rear end sloping downwardly and rearwardly, a holder passing vertically through the body and removably held therein and having an eye at its lower end, a weight detachably connected to the eye, a hook member detachably connected to the eye, a horizontally arranged hook having its shank passing under the body from the rear and detachably connected to the holder, a second holder passing through the rear part of the body and having an eye at its lower end through which the shank of the last mentioned hook passes, rubber legs attached to the rear part of the body and between which the last mentioned hook passes and an eye at the front end of the body for receiving a line.

2. A fish lure comprising a buoyant body having its rear end sloping downwardly and rearwardly, a holder passing vertically through the body and removably held therein and having an eye at its lower end, a horizontally arranged hook having its shank passing under the body from the rear and detachably connected to the holder, a second holder passing through the rear part of the body and having an eye at its lower end through which the shank of the hook passes, rubber legs attached to the rear part of the body and between which the last mentioned hook passes and an eye at the front end of the body for receiving a line.

MYRON E. WILSON.